(12) United States Patent
Gan et al.

(10) Patent No.: US 11,825,353 B2
(45) Date of Patent: Nov. 21, 2023

(54) SYSTEMS AND METHODS FOR CENTRALIZED UNIT LOAD BALANCING IN A RADIO ACCESS NETWORK

(71) Applicant: Verizon Patent and Licensing Inc., Basking Ridge, NJ (US)

(72) Inventors: Seng Gan, Ashburn, VA (US); Subham Biswas, Maharashtra (IN); Christopher A. Graffeo, Tampa, FL (US); Saurabh Tahiliani, Noida (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 74 days.

(21) Appl. No.: 17/536,971

(22) Filed: Nov. 29, 2021

(65) Prior Publication Data
US 2023/0171644 A1    Jun. 1, 2023

(51) Int. Cl.
*H04W 28/08* (2023.01)
(52) U.S. Cl.
CPC ..... *H04W 28/0958* (2020.05); *H04W 28/095* (2020.05)
(58) Field of Classification Search
CPC . H04W 24/08; H04W 28/08; H04W 28/0875; H04W 28/0942; H04W 28/095; H04W 28/0958; H04W 28/10; H04W 84/12
See application file for complete search history.

(56) References Cited

U.S. PATENT DOCUMENTS

| | | | |
|---|---|---|---|
| 2020/0196377 A1* | 6/2020 | Fang | H04B 7/0473 |
| 2020/0267176 A1* | 8/2020 | Asher | H04L 63/1425 |
| 2021/0112616 A1* | 4/2021 | Karandikar | H04W 76/16 |
| 2021/0250813 A1* | 8/2021 | Zhou | H04W 28/09 |
| 2021/0377801 A1* | 12/2021 | Noriega | H04W 28/0812 |
| 2022/0030512 A1* | 1/2022 | Sundararajan | H04W 24/02 |
| 2022/0095283 A1* | 3/2022 | Wei | H04L 5/0003 |
| 2022/0110112 A1* | 4/2022 | Wei | H04W 72/0453 |
| 2022/0124542 A1* | 4/2022 | Li | H04W 88/085 |
| 2022/0159768 A1* | 5/2022 | Zhu | H04L 1/1642 |
| 2022/0167236 A1* | 5/2022 | Melodia | H04W 28/0236 |
| 2022/0272794 A1* | 8/2022 | Aftab | H04W 28/0289 |
| 2022/0278717 A1* | 9/2022 | Tsui | H04B 7/0417 |
| 2022/0279535 A1* | 9/2022 | Tsui | H04B 7/043 |

* cited by examiner

*Primary Examiner* — Alpus Hsu

(57) ABSTRACT

A system described herein may provide a technique for the assignment of Centralized Units ("CUs") to Distributed Units ("DUs") in a radio access network ("RAN") that includes a distributed or hierarchical arrangement of network infrastructure equipment. Different groups of DUs may be modeled based on usage or traffic patterns, and complementary groups of DUs may be identified based on measures of usage that may vary with time. For example, one model associated with one group of DUs may experience relatively heavy usage during morning hours and light usage during evening hours, and another model associated with a complementary group of DUs may experience relatively light usage during morning hours and heavy usage during evening hours.

20 Claims, 16 Drawing Sheets

SYSTEMS AND METHODS FOR CENTRALIZED UNIT LOAD BALANCING IN A RADIO ACCESS NETWORK

BACKGROUND

Wireless networks, such as radio access networks ("RANs"), may make use of a distributed and/or hierarchical arrangement of network infrastructure equipment that carries traffic between User Equipment ("UEs") and a core network. For example, a distributed unit ("DU") may include one or more radio units ("RUs") that communicate wirelessly with one or more UEs. A centralized unit ("CU") may be communicatively coupled to multiple DUs and the core network, and may aggregate, forward, route, etc. traffic between the core network and respective DUs.

DETAILED DESCRIPTION OF EXAMPLE EMBODIMENTS

The following detailed description refers to the accompanying drawings. The same reference numbers in different drawings may identify the same or similar elements.

Figure 1:
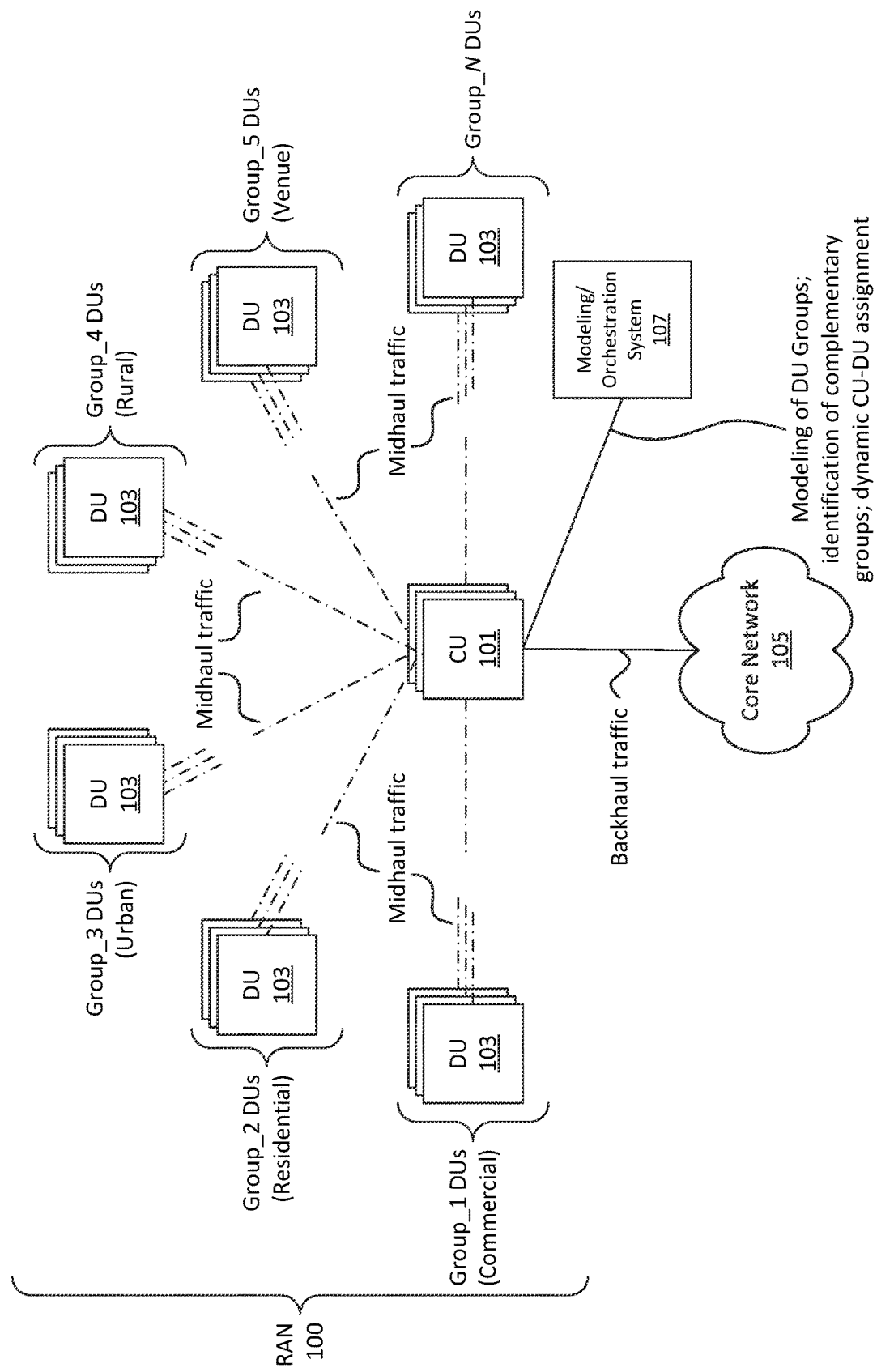
FIG. 1 illustrates an example overview of one or more embodiments described herein.

Embodiments described herein provide for the assignment of CUs to DUs in a RAN that includes a distributed or hierarchical arrangement of network infrastructure equipment. For example, as shown in FIG. 1, RAN 100 may include a set of CUs 101 and multiple different DUs 103. CU 101 may receive traffic from core network 105, such as user plane traffic addressed to a particular UE, such as a mobile phone, Internet of Things ("IoT") device, Machine-to-Machine ("M2M") device, or other suitable type of device that is communicatively coupled to a particular DU 103. For example, CU 101 may identify a particular DU 103 to which the UE is communicatively coupled to, and may forward the traffic to the identified DU 103. DU 103 may forward such traffic to the UE via a wireless interface, such as via an RU or some other suitable type of wireless communication device or system. CU 101 may also receive and/or aggregate traffic from multiple DUs 103, and may forward such traffic to core network 105. Traffic sent between DUs 103 and CUs 101 may sometimes be referred to as "midhaul" traffic while traffic sent between CUs 101 and core network 105 may sometimes be referred to as "backhaul" traffic.

Different DUs 103 may have different attributes, characteristics, etc. As described herein, Modeling/Orchestration System ("MOS") 107 may generate or refine models (e.g., artificial intelligence/machine learning ("AI/ML") models or other suitable types of models) to reflect varying identifiable attributes, characteristics, etc. of different DUs 103. In the example of FIG. 1, MOS 107 may have identified N different "groups" of DUs 103 (e.g., Group_1, Group_2, Group_3, Group_4, Group_5, and Group N). A "group" of DUs 103, as discussed herein, may refer to a set of DUs 103 of RAN 100 that have been identified as being associated with a particular set of attributes, characteristics, etc. The attributes, characteristics, etc. for a particular DU 103 may include usage information associated with the particular DU 103, such as a quantity of UEs connected to the particular DU 103 in a given time period, an amount of midhaul traffic sent to and/or received by the particular DU 103 in a given time period, an amount of backhaul traffic sent to and/or received by the particular DU 103 in a given time period, and/or other types of usage information. In some embodiments, the usage information may include and/or may be based on derived or computed scores or classifications, such as "heavy traffic," "light traffic," "moderate traffic," etc.

In the example of FIG. 1, Group_1 may refer to DUs 103 that are in a "commercial" setting, such as DUs 103 that provide connectivity to UEs in office buildings, downtown areas of a city, and/or other settings that experience relatively heavy usage during a particular time of day and/or day of week (e.g., business hours, morning hours, commute hours, weekdays, etc.) and that experience relatively light usage during other times (e.g., night time hours, weekends, holidays, etc.). Group_2 may refer to DUs 103 that are in a "residential" setting, such as DUs 103 that provide connectivity to UEs in neighborhoods, apartment buildings, or other settings that experience relatively heavy usage during a particular time of day and/or day of week (e.g., night time hours, weekend, holidays, etc.) and that experience relatively light usage during other times (e.g., business hours, morning hours, commute hours, weekdays, etc.). Group_3 may refer to DUs 103 that are in an "urban" setting, such as a city, skyscraper, or other relatively densely populated area that experiences relatively heavy usage on an ongoing basis (e.g., all day, all night, all week, etc.). Group_4 may refer to DUs 103 that are in a "rural" setting, such as a farm, low-population town, or other relatively sparsely populated area that experiences relatively light usage on an ongoing basis. Group_5 may refer to DUs 103 that are in a "venue" setting, such as a stadium, concert hall, or other setting that experiences erratic or unpredictable usage (e.g., coinciding with concerts, sporting events, etc.).

While general examples are provided above of different settings that may be associated with different usage patterns, in practice, DUs 103 may be grouped, classified, categorized, etc. in some other fashion. Further, in practice, DUs 103 may be grouped into additional, fewer, and/or different groups than the examples discussed herein.

As discussed herein, MOS 107 may generate, modify, train, etc. one or more DU group models that associate particular DU attributes, characteristics, usage patterns, etc. to particular DU groups. MOS 107 may, in some embodiments, identify complementary DU groups. "Complementary" DU groups, as referred to herein, may include DU groups that may have dissimilar usage patterns, and/or DU groups which have usage patterns that peak at different times (e.g., different times of day, different days of the week, etc.). MOS 107 may utilize DU models (e.g., during "run time" operation) to identify a particular group associated with a particular DU 103 based on attributes, characteristics, usage patterns, etc. of the particular DU 103. MOS 107 may further perform load balancing, dynamic assignment, allocation, configuration, provisioning, etc. of DUs 103 based on determined models and/or groups associated with such DUs 103, and further based on the identified complementary groups. MOS 107 may, for instance, cause a "blend" or mix of DUs 103 of complementary groups to be assigned to a particular CU 101.

For example, CUs 101 and/or DUs 103 may be, may include, may be implemented by, and/or may be communicatively coupled to containerized and/or virtualized devices or systems that may be dynamically configured, instantiated, etc. in a containerized environment which may include one or more virtual machines, cloud computing systems, datacenters, servers, or the like. In some embodiments, MOS 107, CUs 101, and/or DUs 103 may implement a suitable application programming interface ("API") or protocol, such as the open-source Kubernetes API or some other API or protocol, via which MOS 107 may instantiate, provision, install, configure, etc. one or more instances of CUs 101 and/or DUs 103 on such devices or systems. In some embodiments, MOS 107 may modify one or more routing tables, Domain Name System ("DNS") entries, or the like in order to associate a particular CU 101 with a particular DU 103 (e.g., to "assign" CU 101 to DU 103). Once a particular CU 101 has been assigned to a particular DU 103, traffic between a core network and the particular DU 103 may be handled by the particular CU 101 (e.g., in lieu of one or more other CUs 101).

In this manner, the resource load on CU 101 (e.g., the load or usage of processing resources, network resources, or other resources) may be more balanced over time as compared to if CU 101 were associated with a relatively large quantity or proportion of DUs 103 that exhibit similar traffic patterns. For example, as further discussed herein, a particular CU 101 may be assigned to serve a blend of Group_1 DUs 103 and Group_2 DUs 103. In this manner, the particular CU 101 may communicate a relatively large proportion or amount of traffic to and/or from Group_1 DUs 103 during a first set of time periods (e.g., business hours, weekdays, etc.) and a relatively small proportion or amount of traffic to and/or from Group_2 DUs 103 during the first set of time periods. The particular CU 101 may further communicate a small proportion or amount of traffic to and/or from Group_1 DUs 103 during a second set of time periods (e.g., night time hours, weekends, etc.) and a relatively large proportion or amount of traffic to and/or from Group_2 DUs 103 during the second set of time periods. In this manner, CU 101 may have a higher measure of utilization, uptime, etc. (and/or a lower measure of idle time) and may further be less subject to overloading at particular times than an implementation where CU 101 serves a relatively large quantity or proportions DUs 103 that experience heavy usage at the same time.

Figure 2:
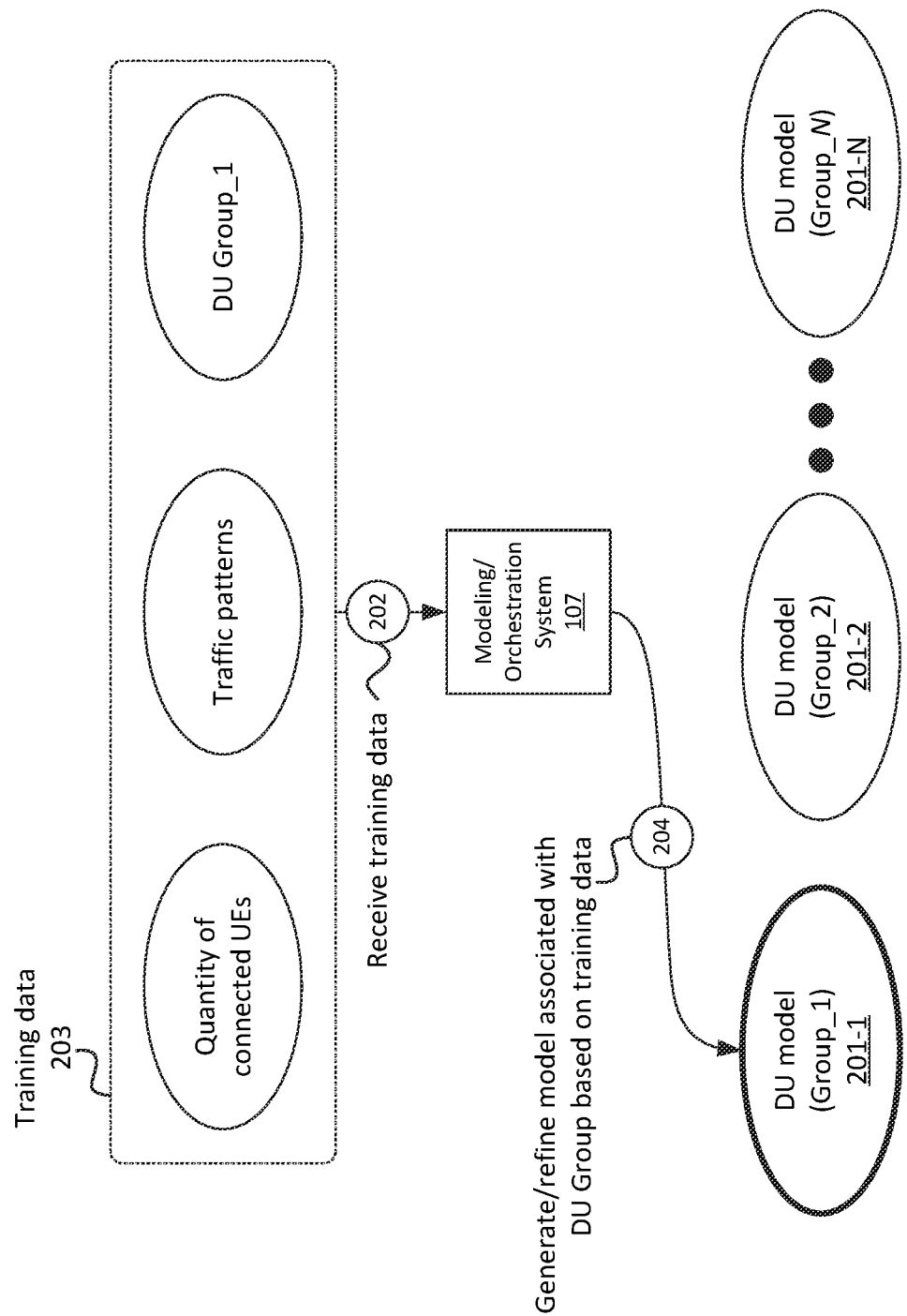
FIG. 2 illustrates an example generation and/or modification of one or more DU models, in accordance with one or more embodiments described herein.

FIG. 2 illustrates an example generation, refinement, training, etc. of one or more DU models 201. As shown, MOS 107 may receive (at 202) training data 203 that associates attributes, characteristics, etc. of one or more DUs 103 to a particular DU group (i.e., DU Group_1, in this example). The attributes, characteristics, etc. of a particular DU 103 may include a quantity of connected UEs over a given time period, traffic patterns over a given time period, and/or other attributes, characteristics, etc. of the particular DU 103. The traffic patterns may include and/or may be based on an amount of uplink traffic (e.g., traffic sent by UEs) over a given time period, an amount of downlink traffic (e.g., traffic sent to UEs) over a given time period, an amount of uplink and/or downlink midhaul traffic over a given time period, an amount of uplink and/or downlink backhaul traffic over a given time period, and/or other metrics of traffic sent and/or received by the particular DU 103. Training data 203 may include data generated via one or more simulations and/or received via measuring real-world performance or attributes of DUs 103.

MOS 107 may further maintain one or more DU models 201 that are each associated with a particular DU group. In this example, MOS 107 may generate, refine, train, etc. DU model 201-1, associated with DU Group_1, based on the received training data 203. For example, MOS 107 may identify that training data 203 is associated with DU Group_1 based on an indicator, identifier, flag, etc. included in training data 203, indicating that this instance of training data 203 is associated with DU Group_1. MOS 107 may train, modify, refine, etc. DU model 201-1 by combining some or all of the information included in training data 203 (e.g., quantity of connected UEs over a given time period, traffic patterns over a given time period, etc.) with information included in DU model 201-1.

In some embodiments, one or more DU models 201 may include a sequential multilayer perceptron model or other suitable type of model generated or modified using any suitable technique, such as an AI/ML technique or other type of technique. In some embodiments, DU models 201 may include and/or may be generated based on one or more fully connected and/or dense layers that associate particular DU attributes, characteristics, usage patterns, etc. with a particular DU group. In some embodiments, MOS 107 may utilize Rectified Linear Unit, Softmax, and/or other types of activation functions in generating and/or refining one or more DU models 201.

Figure 3:
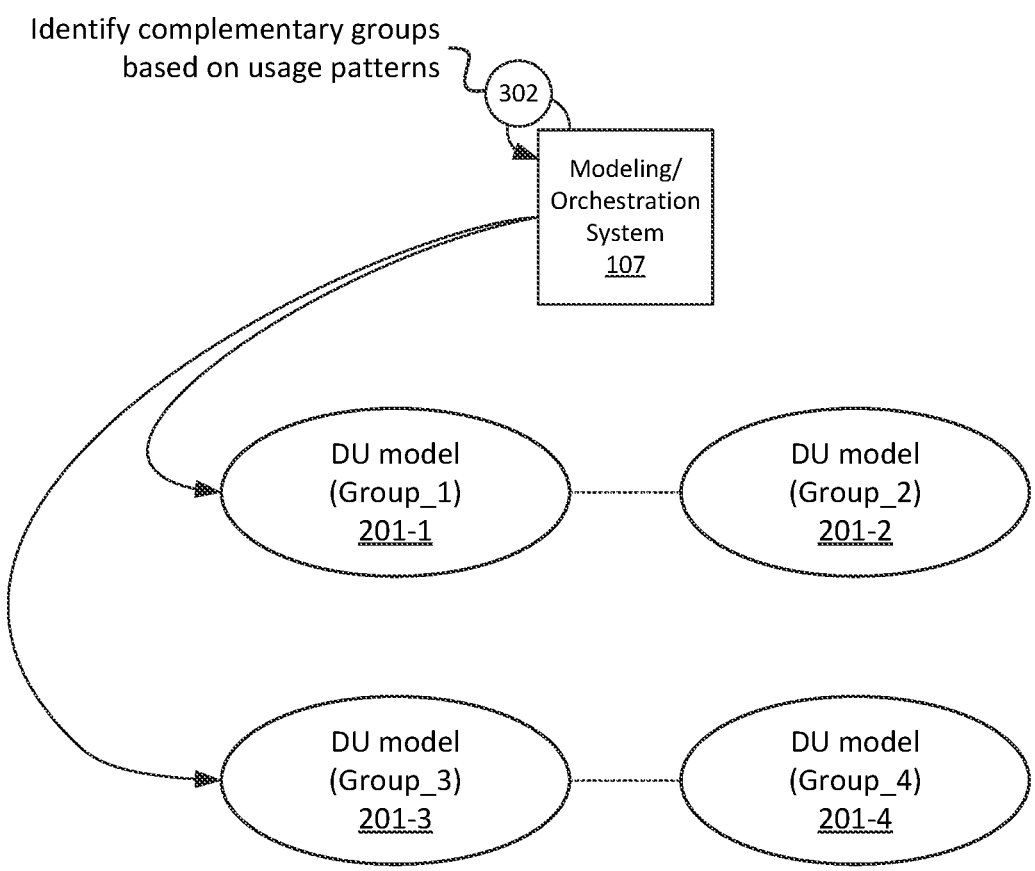
FIG. 3 illustrates an example identification of complementary DU models, in accordance with one or more embodiments described herein.

As shown in FIG. 3, MOS 107 may identify (at 302) complementary DU groups. In some embodiments, complementary DU groups may be groups for which the usage patterns vary within a time period, such as a cyclical time period (e.g., within a day, week, month, etc.). A measure of usage associated with DUs 103 of complementary DU groups may match (e.g., may be equal to) or may be within a threshold range of (e.g., may be 5% greater than, 10% greater than, etc.) a measure of usage associated with DUs 103 of one of the sets of complementary DU groups. In other words, a particular CU 101 that is assigned to serve DUs 103 of complementary DU groups may exhibit or experience a maximum measure of load that is equal to, or about equal to (e.g., within a threshold range of), a maximum measure of load that would be exhibited or experienced if assigned to serve DUs 103 of only one of the complementary DU groups. In this example, MOS 107 may identify that DU Group_1 and DU Group_2 are complementary groups, and may accordingly associate DU models 201-1 and 201-2 with each other. Similarly, MOS 107 may identify that DU Group_3 and DU Group_4 are complementary groups, and may accordingly associate DU models 201-3 and 201-4 with each other.

MOS 107 may further identify that DU Group_5 is not complementary with other DU groups. For example, MOS 107 may determine that usage information associated with DU Group_5 is not cyclical in nature, is not predictable, and/or otherwise that no other DU group (e.g., as indicated by one or more DU models 201) is associated with usage patterns that are complementary to usage information of DU Group_5 (e.g., as indicated by DU model 201-5).

While examples are discussed herein in the context of complementary DU groups that include two DU groups, in practice, more than two DU groups may be identified as complementary with each other. For example, MOS 107 may identify that three or more DU groups are complementary with each other.

Figure 4A:
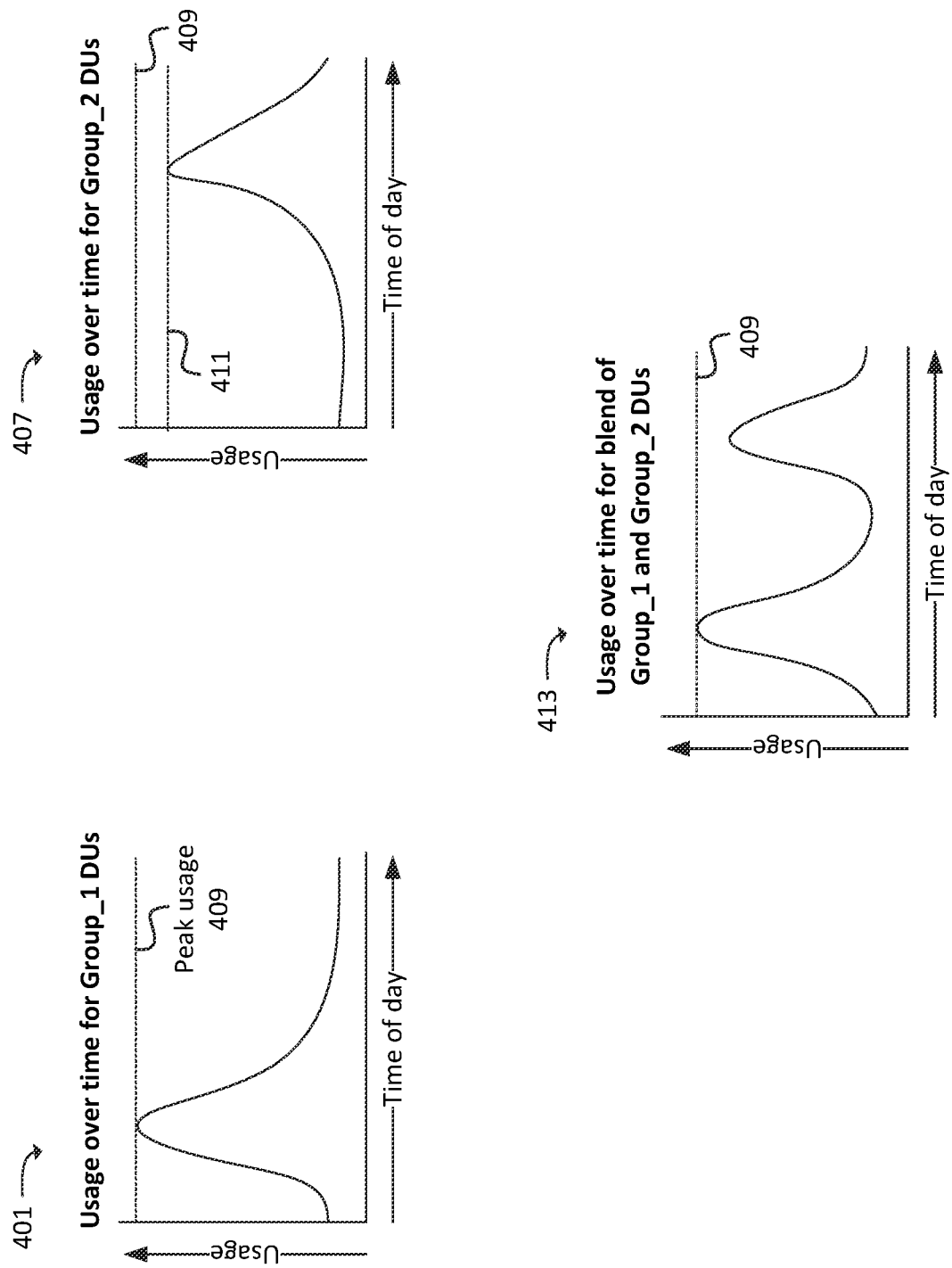
FIGS. 4A-4C, 5, and 6 illustrate example measures of usage indicated by one or more DU models, in accordance with one or more embodiments described herein.
Figure 4B:
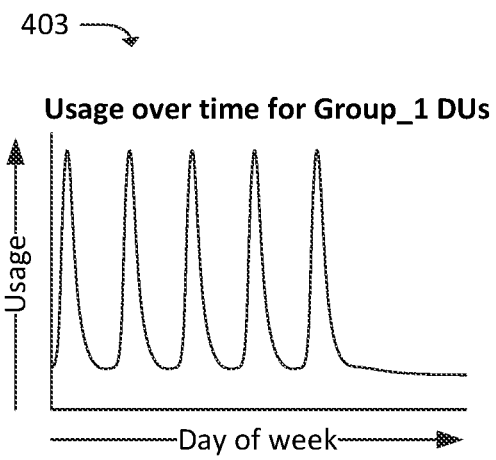
Figure 4B:
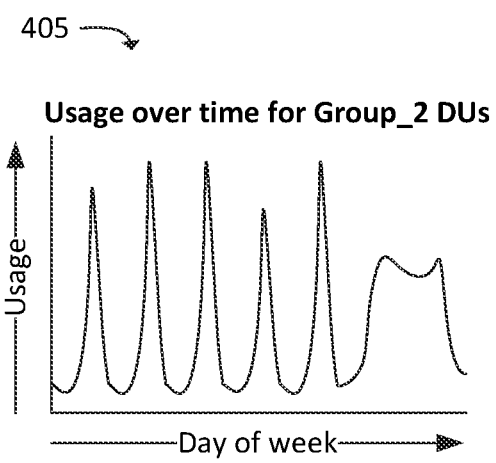
Figure 5:
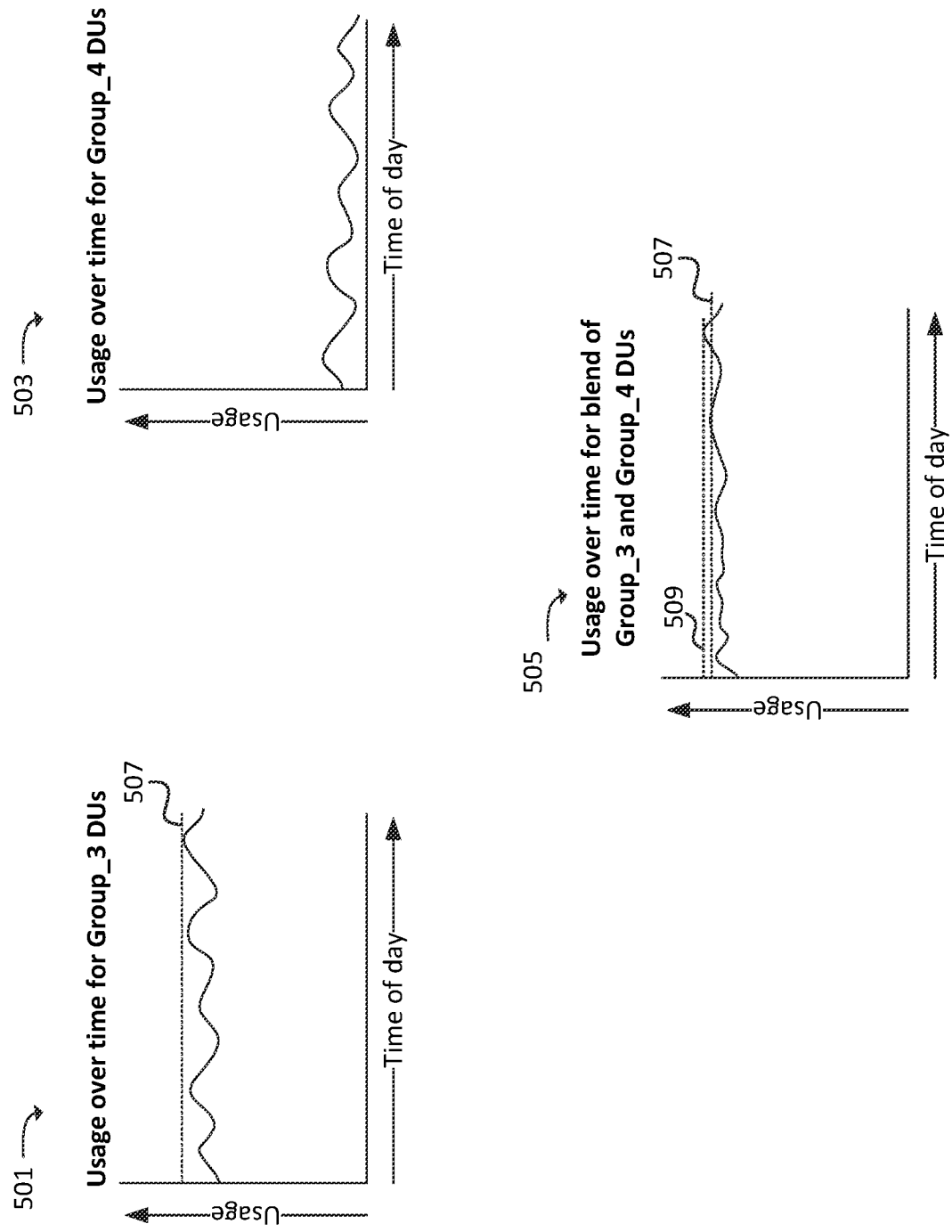

FIGS. 4A, 4B, and 5 illustrate examples of usage information of DU groups that have been identified as complementary. As shown in FIG. 4A, for example, graph 401 indicates example usage information over a period of time associated with Group_1 DUs 103. Graph 401 may reflect usage information included in DU model 201-1, associated with DU Group_1. For example, the vertical axis may reflect "usage," which may include and/or may be derived from a quantity of connected UEs to Group_1 DUs 103 as a function of time, traffic patterns associated with Group_1 DUs 103 as a function of time, and/or other suitable factors. In some embodiments, the "usage" indicated in graph 401 may include one or more scores, average values, median values, etc. based on one or more factors. For example, "usage" may be based on a score that is computed (e.g., by MOS 107) based on a measure of quantity of connected UEs and traffic patterns (and/or one or more other factors) as a function of time.

Graph 401 may reflect a cyclical time period, such as a one-day (e.g., 24-hour) window. Thus, the example information shown in graph 401 may indicate a measure of usage associated with Group_1 DUs 103 (e.g., as indicated by DU model 201-1) over a one-day window. In some embodiments, graph 401 may reflect average, median, etc. usage which may be repeated from day to day. In some embodiments, graph 401 may reflect usage information associated with Group_1 DUs 103 over some days of the week (e.g., weekdays) while a different graph may reflect different usage information associated with the same Group_1 DUs 103 over other days of the week (e.g., weekends). For example, FIG. 4B illustrates graphs 403 and 405, which may include usage information for Group_1 and Group_2 DUs 103 over the span of a weekly time period (e.g., as indicated by DU models 201-1 and 201-2, respectively).

Returning to FIG. 4A, graph 407 indicates example usage information (e.g., over the span of a daily time period) associated with Group_2 DUs 103. MOS 107 may identify that Group_1 and Group_2 are complementary DU groups, as the aggregate usage of both DU groups may not exceed (or, in some embodiments, may be within a threshold range of) a peak usage of one of the DU groups. For example, Group_1 DUs 103 may be associated with a peak usage 409 at a particular time of day, as shown in graph 401. As reflected in graph 407, Group_2 DUs 103 may be associated with a lower measure of peak usage 411 during the same time period.

As further shown, graph 413 reflects usage associated with a blend of Group_1 and Group_2 DUs 103. For example, as part of identifying (at 302) complementary DU groups based on usage information, MOS 107 may combine usage information for multiple DU groups in order to predict, estimate, and/or otherwise determine a measure of usage associated with a combination or blend of DUs 103 from different DU groups. In some embodiments, graph 413 may represent a sum, union, or other combination of usage information reflected by graphs 401 and 407 (e.g., associated with Group_1 and Group_2). In this example, the combined usage shown in graph 413 has the same peak usage 409 as the peak usage 409 indicated in graph 401 for Group_1. As the peak usage 409 of graph 413 (which includes usage information for a blend of Group_1 and Group_2) is the same as the peak usage 409 of graph 401 (which includes usage information for Group_1), MOS 107 may determine that Group_1 and Group_2 are complementary groups.

Figure 4C:
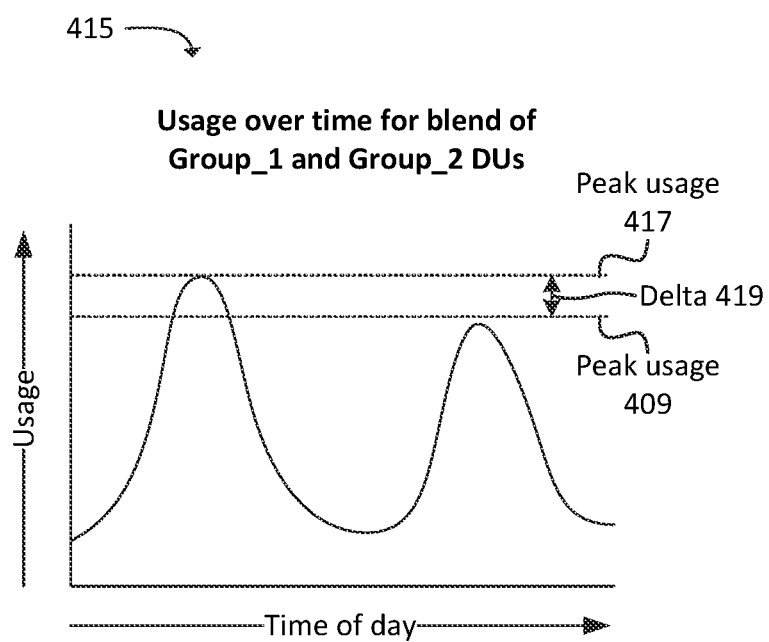

As noted above, DU groups may be identified as complementary in situations where the peak usage of a blend of the DU groups exceeds the peak usage of some or all of the DU groups. For example, as shown in FIG. 4C, graph 415 illustrates another example of usage information associated with a blend of Group_1 and Group_2 DUs 103. In this example, the combined usage information may have been determined in a different manner (e.g., using a different computation, using different usage metrics, etc.) than in graph 413. Here, the peak usage 417 of the blend of Group_1 and Group_2 DUs 103 may be higher than the peak usage 409 of one of the DU groups (e.g., of Group_1). The difference between these measures of peak usage is shown as delta 419. In some embodiments, MOS 107 may determine that delta 419 is lower than a threshold, and that Group_1 and Group_2 are therefore complementary groups, even though the peak usage 417 of the blend of these groups is higher than the peak usage 409 of each of the groups. That is, peak usage 417 may be within a threshold range of peak usage 409.

FIG. 5 illustrates another example of complementary DU groups that may be identified by MOS 107. For example, as shown, graphs 501 and 503 represent usage information for Group_3 and Group_4. Group_3 may include, for example, DUs 103 deployed in a setting in which usage is fairly consistently high throughout the day, such as a city, a skyscraper, etc. Group_4 may include, for example, DUs 103 deployed in a setting in which usage is fairly consistently low throughout the day, such as a rural area, a farm, etc. Thus, the peak usage 507 associated with Group_3 may be relatively high, while the peak usage associated with Group_4 may be relatively low. MOS 107 may identify that Group_3 and Group_4 are complementary groups, as the peak usage 509 associated with a combination of usage information of Group_3 and Group_4 is within a threshold range of peak usage 507 (e.g., the higher peak usage between Group_3 and Group_4). That is, a delta between peak usage 507 and peak usage 509 may be lower than a threshold delta.

Figure 6:
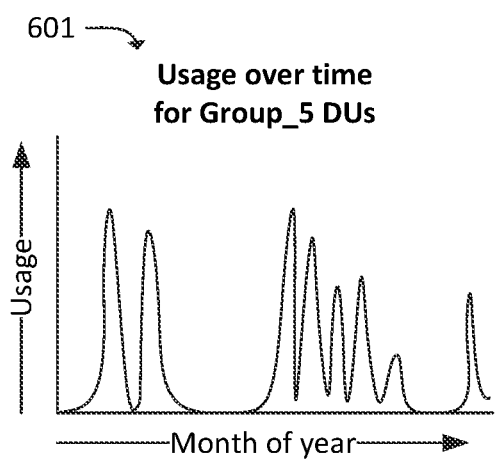

FIG. 6 illustrates an example of usage information of a particular DU group (e.g., Group_5) for which MOS 107 does not identify a complementary DU group. For example, based on DU model 201-5, MOS 107 may identify a relatively non-repeating, unpredictable, erratic, etc. set of usage information for Group_5. For example, as shown in graph 601, over the span of a year, DUs 103 of Group_5 may experience times of relatively heavy usage and times of relatively light usage. Heavy usage may coincide with events, such as concerts, sporting events, conventions, etc., while light usage may coincide with times at which such events are not taking place. MOS 107 may determine that Group_5 is not complementary with any other group by performing an analysis in which usage information associated with Group_5 is combined with usage information associated with one or more other groups, and a determination that a measure of usage (e.g., peak usage, average usage, etc.) of the combination of DU groups (including Group_5) exceeds peak usage of each DU group of the combination (e.g., Group_5 and the one or more other DU groups).

Figure 7:
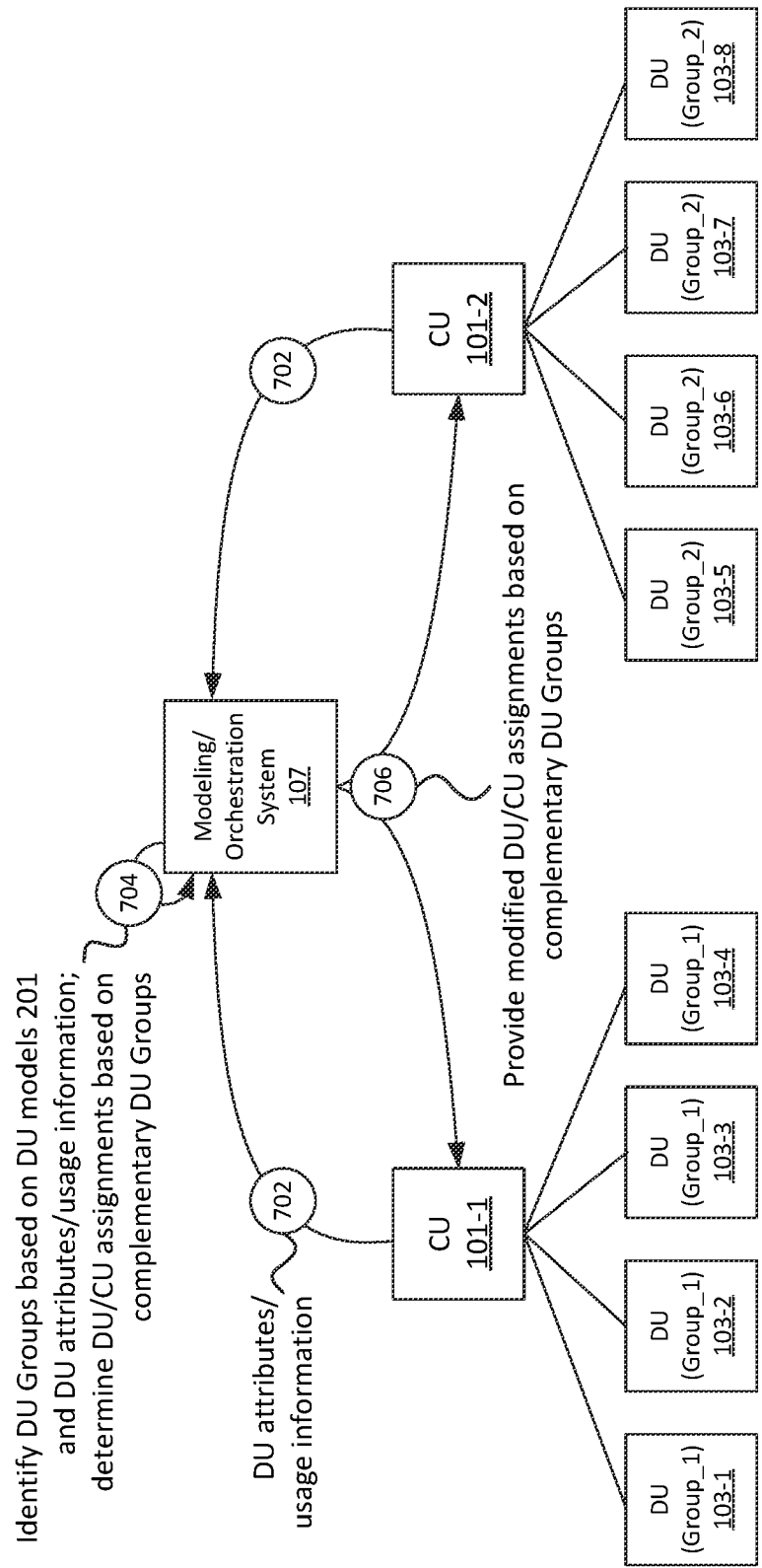
FIGS. 7 and 8 illustrate an example configuration of one or more DUs and/or CUs based on identified complementary groups of DUs, in accordance with one or more embodiments described herein.

MOS 107 may utilize DU models 201 as well as the identifications of complementary DU groups (e.g., based on usage information associated with DU models 201) to dynamically configure one or more CUs 101 and/or DUs 103. For example, as shown in FIG. 7, MOS 107 may receive (at 702) DU attributes, usage information, etc. associated with a set of DUs 103 (i.e., DUs 103-1 through 103-8, in this example). In this example, DUs 103-1 through 103-4 are communicatively coupled to (e.g., assigned to) a first CU 101-1, while DUs 103-5 through 103-8 are communicatively coupled to a second CU 101-2. In this example, MOS 107 may receive the information associated with DUs 103-1 through 103-8 from CUs 101-1 and 101-2. In some embodiments, MOS 107 may receive such information directly from DUs 103 (e.g., via an API or other suitable communication pathway) and/or from some other device or system that monitors and/or provides such information. The received (at 702) information may include traffic and/or usage patterns associated with DUs 103 over time, such as quantity of connected UEs within a given time period, amount of uplink and/or downlink traffic within a given time period, etc.

MOS 107 may identify (at 704) particular DU groups with which respective DUs 103 are associated based on the received (at 702) information. For example, MOS 107 may compare the received usage information to one or more DU models 201, and may identify based on the comparing that DUs 103-1 through 103-4 are associated with DU Group_1 and that DUs 103-5 through 103-8 are associated with DU Group_2. MOS 107 may further determine (at 404) modified DU/CU assignments based on the identification of complementary groups with which DUs 103-1 through 103-8 are respectively associated. For example, MOS 107 may perform one or more suitable load balancing techniques to determine that one or more DUs 103 that are assigned to (e.g., communicatively coupled to) CU 101-1 should be instead assigned to CU 101-2, and that one or more DUs 103 that are assigned to CU 101-2 should be instead assigned to CU 101-1. In this manner, MOS 107 may identify a particular blend of Group_1 and Group_2 DUs 103 (e.g., DUs 103 of complementary DU groups) that should be assigned to each CU 101. Accordingly, MOS 107 may provide (at 706) one or more instructions to CUs 101-1 and 101-2 to modify the sets of DUs 103 that are respectively assigned to CUs 101-1 and 101-2. In some embodiments, MOS 107 may provide (at 706) the modified CU/DU assignments to DUs 103 and/or to one or more other devices or systems that are capable of facilitating a modification of the assignments of CUs 101 and DUs 103.

Figure 8:
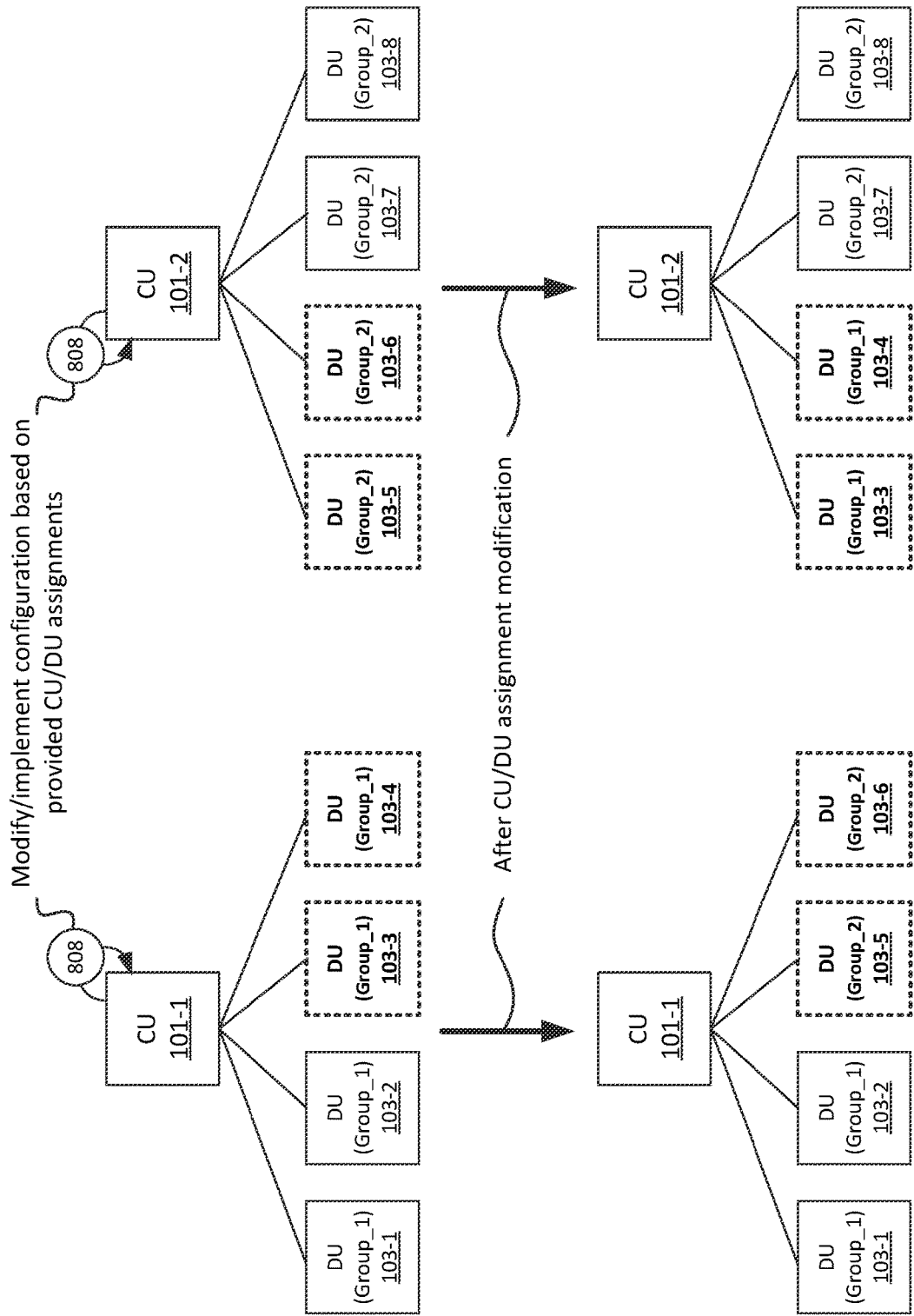

As shown in FIG. 8, based on the provided (at 706) modifications, CUs 101-1 and 101-2 may perform (at 808) one or more modifications to configuration information and/or may otherwise implement the instructed modifications. In this example, the modifications may include assigning two DUs 103 that were previously assigned to CU 101-1 (e.g., CUs 103-3 and 103-4) to CU 101-2. The modifications may also include assigning two DUs 103 that were previously assigned to CU 101-2 (e.g., DUs 103-5 and 103-6) to CU 101-1. In this manner, after the modification of the assignments of DUs 103-3 through 103-6, CUs 101-1 and 101-2 may both be associated with a blend of Group_1 and Group_2 DUs 103. As discussed above, the blend of groups with diversified usage patterns as a function of time may result in a reduced incidence of overload at CUs 101-1 and 101-2, as well as increased utilization (e.g., lower idle time) of CUs 101-1 and 101-2. The increased utilization may allow for fewer CUs 101 to be deployed, thus reducing the amount of energy consumption and/or other resources used by CUs 101. The reduced incidence of overload at CUs 101 may improve the user experience of users using UEs that access a core network (or other type of network) via DUs 103 and/or CUs 101.

While FIGS. 7 and 8 are described in the context of reconfiguring and/or reassigning one or more CUs 101 and/or DUs 103, in some embodiments, similar techniques may be used when performing an initial configuration, network planning, network deployment, and/or other suitable type of operation. For example, a type of DU 103 may be identified based on DU models 201 and/or based on an explicit indication of DU group, and MOS 107 may configure, provision, etc. one or more CUs 101 such that suitable blends of DUs 103 are assigned to such CUs 101, as similarly discussed above.

For example, during such a procedure, MOS 107 may identify a pool of available CUs 101 and/or hardware resources available to implement such CUs 101 (e.g., virtual or bare metal hardware resources associated with one or more datacenters, servers, cloud computing systems, virtual machines, etc.), and may also identify a pool of DUs 103 for which a CU 101 should be assigned. MOS 107 may assign CUs 101 to serve DUs 103 in a manner described above, such as by using expected or predicted measure of usage associated with particular DUs 103 and/or combinations of DUs 103 based on DU models 201 (e.g., based on DU groups) associated with such DUs 103.

Figure 9:
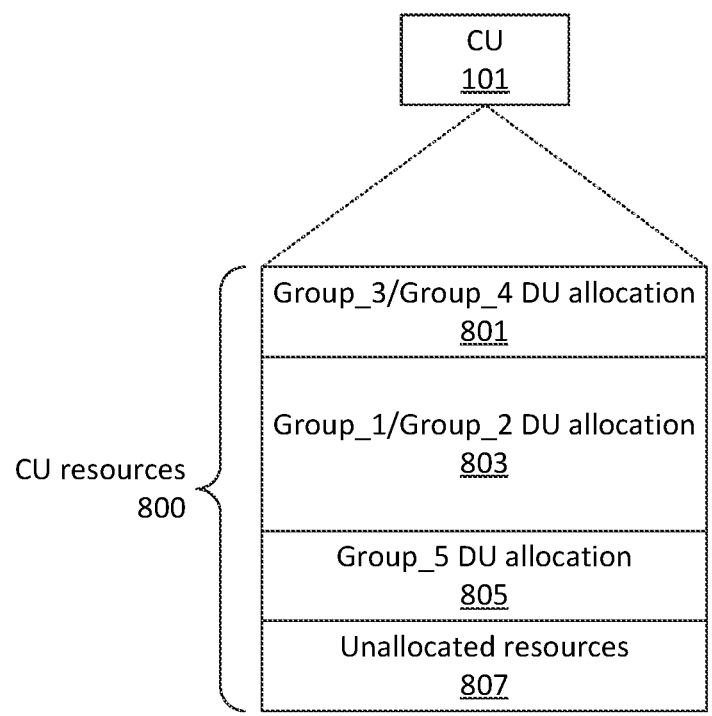
FIG. 9 illustrates an example allocation of CU resources based on assigned DUs, in accordance with one or more embodiments described herein.

FIG. 9 illustrates an example allocation of resources 800 associated with a particular CU 101, based on the dynamic assignment techniques discussed herein. Resources 800 are illustrated as a block, which may represent a capacity or other measure of processing resources, memory resources, network resources, and/or one or more other resources. In some embodiments, "resources 800" may refer to an aggregate or composite of multiple or all resources of CU 101. In some embodiments, "resources 800" may refer to a particular type of resource, such as a processing resource, a memory resource, etc.

Based on the assignment of particular DUs 103 to CU 101, particular subsets of resources 800 of CU 101 may be allocated, reserved, etc. For example, a first set of resources 801 may be allocated for Group_3 and Group_4 DUs 103. In some embodiments, the amount of allocated resources (e.g., first resources 801, second resources 803, and third resources 805) for a given DU group (or combination of DU groups) may be based on a measure of expected usage associated with the given DU group or combination of DU groups. The measure of expected usage may, for example, be equal to or otherwise based on a peak usage determined based on corresponding DU models 201 for the DU group or combination of DU groups. For example, the amount of resources 801 allocated for the combination of Group_3 and Group_4 may be equal to or may otherwise be based on (e.g., may be 110%, 120%, etc. of) peak usage 507 and/or peak usage 509, as discussed above with respect to FIG. 5. Similarly, the amount of resources 803 allocated for the combination of Group_1 and Group_2 may be equal to or may otherwise be based on peak usage 409 and/or peak usage 417, as discussed above with respect to FIGS. 4A and 4C.

As further shown, resources 805 of CU 101 may be allocated for Group_5 DUs 103, and a portion of resources 807 of CU 101 may be unallocated. Unallocated resources 807 may, for example, be available for allocation on behalf of one or more other DUs 103 at some future time.

Figure 10:
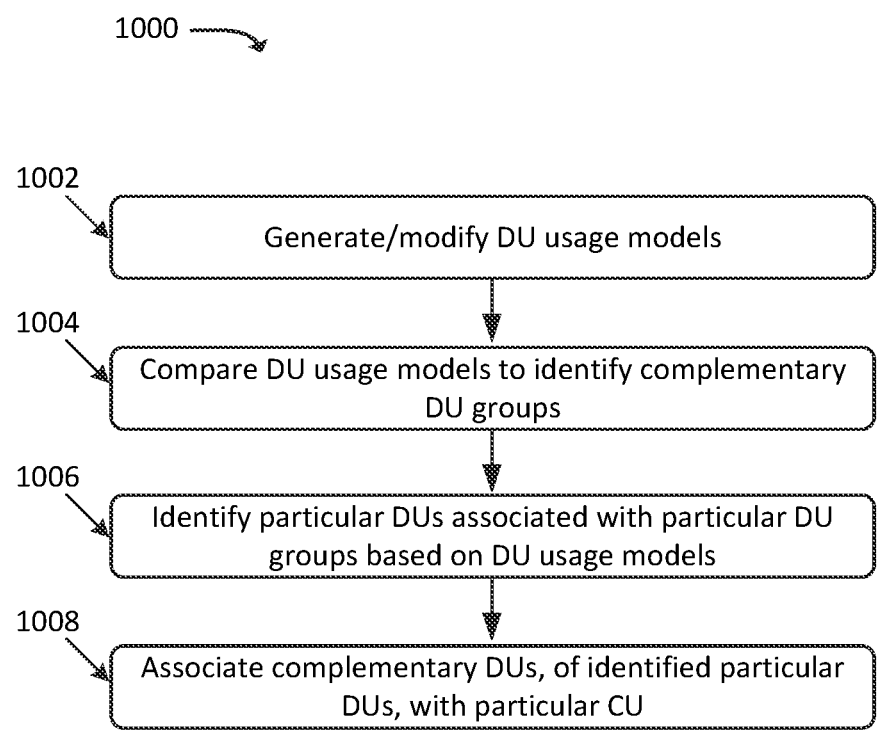
FIG. 10 illustrates an example process for configuring one or more DUs and/or CUs based on identified complementary groups of DUs, in accordance with one or more embodiments described herein.

FIG. 10 illustrates an example process 1000 for configuring of one or more DUs 103 and/or CUs 101 based on identified complementary groups of DUs 103. In some embodiments, some or all of process 1000 may be performed by MOS 107. In some embodiments, one or more other devices may perform some or all of process 1000 in concert with, and/or in lieu of, MOS 107.

As shown, process 1000 may include generating and/or modifying (at 1002) one or more DU usage models (e.g., one or more DU models 201). For example, as discussed above, MOS 107 and/or some other device or system may monitor and/or receive usage information (e.g., simulated and/or real-world usage information) associated with one or more DUs 103 along with identifying information regarding a particular group with which such DUs 103 are associated. MOS 107 may generate or modify DU models 201, where each model 201 is associated with a particular DU group, based on the received information.

Process 1000 may further include comparing (at 1004) the DU usage models to identify complementary DU groups and/or complementary DU usage models. For example, as discussed above, MOS 107 may compare usage as a function of time, as indicated in different DU models 201, to identify DU models 201 (and/or corresponding DU groups) that are complementary. As discussed above, a set of DU models 201 and/or DU groups may be complementary if, for example, the peak usage associated with a combination of DUs of different groups is equal to, or is within a threshold range of, the peak usage associated with one of the DU groups. In some embodiments, in a situation where multiple different DU groups are associated with different peak measures of usage, the groups may be identified as complementary when the peak usage associated with the combination of DUs of different groups is equal to, or is within a threshold range of, the highest peak usage associated with the DU groups. In some embodiments, one or more other operations or criteria may be performed, including load balancing operations, to identify complementary DU models 201 and/or complementary DU groups.

Process 1000 may additionally include identifying (at 1006) particular DUs 101 that are associated with particular DU groups based on DU models 201. For example, MOS 107 may receive usage information associated with one or more DUs 103, may compare the usage information to DU models 201, and may select a particular DU model 201 based on a match or other determination of correlation or similarity between the usage information of the one or more DUs 103 and the usage information indicated by the particular DU model 201. Additionally, or alternatively, MOS 107 may receive an explicit indication of a DU group with which the one or more DUs 103 are associated, and/or may identify the DU group with which the one or more DUs 103 are associated in some other fashion.

Process 1000 may also include associating (at 1008) complementary DUs 103 with a particular CU 101. For example, as discussed above, resources of a particular CU 101 may be allocated based on a predicted or expected measure of usage associated with complementary DUs 103. Complementary DUs 103 may be assigned to the particular CU 101, such that an aggregate amount of resources allocated for complementary DUs 103 may be about equal to (e.g., within a threshold range of) the amount of resources that would be allocated for DUs 103 of only one DU group. In this manner, utilization of resources of CU 101 may be increased without substantially increasing the amount of load that CU 101 may experience during peak times.

Figure 11:
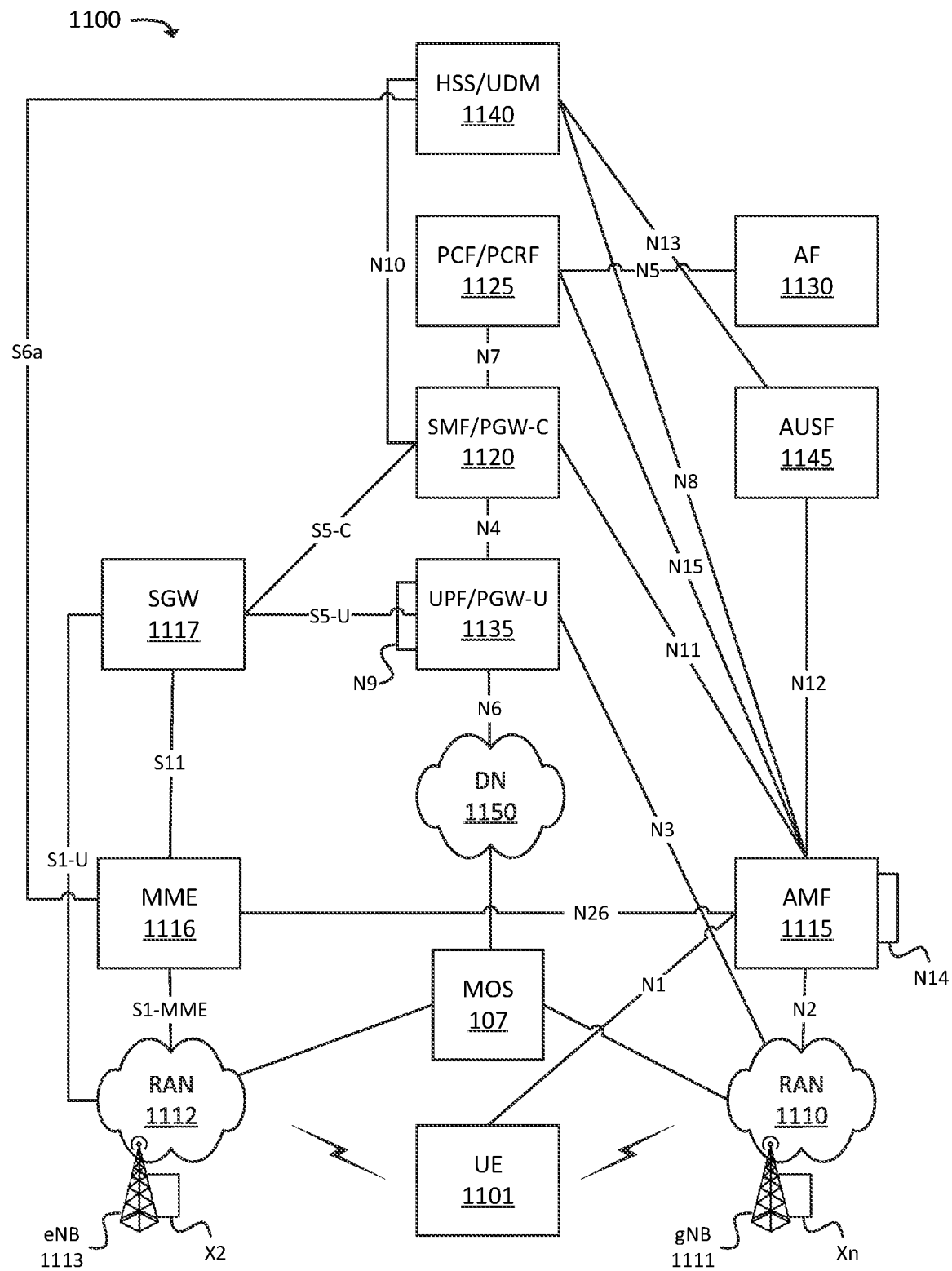
FIG. 11 illustrates an example environment in which one or more embodiments, described herein, may be implemented.

FIG. 11 illustrates an example environment 1100, in which one or more embodiments may be implemented. In some embodiments, environment 1100 may correspond to a Fifth Generation ("5G") network, and/or may include elements of a 5G network. In some embodiments, environment 1100 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1100 may include UE 1101, RAN 1110 (which may include one or more Next Generation Node Bs ("gNBs") 1111), RAN 1112 (which may include one or more evolved Node Bs ("eNBs") 1113), and various network functions such as Access and Mobility Management Function ("AMF") 1115, Mobility Management Entity ("MME") 1116, Serving Gateway ("SGW") 1117, Session Management Function ("SMF")/Packet Data Network ("PDN") Gateway ("PGW")-Control plane function ("PGW-C") 1120, Policy Control Function ("PCF")/Policy Charging and Rules Function ("PCRF") 1125, Application Function ("AF") 1130, User Plane Function ("UPF")/PGW-User plane function ("PGW-U") 1135, Home Subscriber Server ("HSS")/Unified Data Management ("UDM") 1140, and Authentication Server Function ("AUSF") 1145. Environment 1100 may also include one or more networks, such as Data Network ("DN") 1150. Environment 1100 may include one or more additional devices or systems communicatively coupled to one or more networks (e.g., DN 1150), such as MOS 107.

The example shown in FIG. 11 illustrates one instance of each network component or function (e.g., one instance of SMF/PGW-C 1120, PCF/PCRF 1125, UPF/PGW-U 1135, HSS/UDM 1140, and/or AUSF 1145). In practice, environment 1100 may include multiple instances of such components or functions. For example, in some embodiments, environment 1100 may include multiple "slices" of a core network, where each slice includes a discrete set of network functions (e.g., one slice may include a first instance of SMF/PGW-C 1120, PCF/PCRF 1125, UPF/PGW-U 1135, HSS/UDM 1140, and/or AUSF 1145, while another slice may include a second instance of SMF/PGW-C 1120, PCF/PCRF 1125, UPF/PGW-U 1135, HSS/UDM 1140, and/or AUSF 1145). The different slices may provide differentiated levels of service, such as service in accordance with different Quality of Service ("QoS") parameters.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. Alternatively, or additionally, one or more of the devices of environment 1100 may perform one or more network functions described as being performed by another one or more of the devices of environment 1100. Devices of environment 1100 may interconnect with each other and/or other devices via wired connections, wireless connections, or a combination of wired and wireless connections. In some implementations, one or more devices of environment 1100 may be physically integrated in, and/or may be physically attached to, one or more other devices of environment 1100.

UE 1101 may include a computation and communication device, such as a wireless mobile communication device that is capable of communicating with RAN 1110, RAN 1112, and/or DN 1150. UE 1101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, an M2M device, or the like), or another type of mobile computation and communication device. UE 1101 may send traffic to and/or receive traffic (e.g., user plane traffic) from DN 1150 via RAN 1110, RAN 1112, and/or UPF/PGW-U 1135.

RAN 1110 may be, or may include, a 5G RAN that includes one or more base stations (e.g., one or more gNBs 1111), via which UE 1101 may communicate with one or more other elements of environment 1100. UE 1101 may communicate with RAN 1110 via an air interface (e.g., as provided by gNB 1111). For instance, RAN 1110 may receive traffic (e.g., voice call traffic, data traffic, messaging traffic, signaling traffic, etc.) from UE 1101 via the air interface, and may communicate the traffic to UPF/PGW-U 1135, and/or one or more other devices or networks. Similarly, RAN 1110 may receive traffic intended for UE 1101 (e.g., from UPF/PGW-U 1135, AMF 1115, and/or one or more other devices or networks) and may communicate the traffic to UE 1101 via the air interface.

RAN 1112 may be, or may include, a LTE RAN that includes one or more base stations (e.g., one or more eNBs 1113), via which UE 1101 may communicate with one or more other elements of environment 1100. UE 1101 may communicate with RAN 1112 via an air interface (e.g., as provided by eNB 1113). For instance, RAN 1110 may receive traffic (e.g., voice call traffic, data traffic, messaging traffic, signaling traffic, etc.) from UE 1101 via the air interface, and may communicate the traffic to UPF/PGW-U 1135, and/or one or more other devices or networks. Similarly, RAN 1110 may receive traffic intended for UE 1101 (e.g., from UPF/PGW-U 1135, SGW 1117, and/or one or more other devices or networks) and may communicate the traffic to UE 1101 via the air interface.

AMF 1115 may include one or more devices, systems, Virtualized Network Functions ("VNFs"), Cloud-Native Network Functions ("CNFs"), etc., that perform operations to register UE 1101 with the 5G network, to establish bearer channels associated with a session with UE 1101, to hand off UE 1101 from the 5G network to another network, to hand off UE 1101 from the other network to the 5G network, manage mobility of UE 1101 between RANs 1110 and/or gNBs 1111, and/or to perform other operations. In some embodiments, the 5G network may include multiple AMFs 1115, which communicate with each other via the N14 interface (denoted in FIG. 11 by the line marked "N14" originating and terminating at AMF 1115).

MME 1116 may include one or more devices, systems, VNFs, CNFs, etc., that perform operations to register UE 1101 with the EPC, to establish bearer channels associated with a session with UE 1101, to hand off UE 1101 from the EPC to another network, to hand off UE 1101 from another network to the EPC, manage mobility of UE 1101 between RANs 1112 and/or eNBs 1113, and/or to perform other operations.

SGW 1117 may include one or more devices, systems, VNFs, CNFs, etc., that aggregate traffic received from one or more eNBs 1113 and send the aggregated traffic to an external network or device via UPF/PGW-U 1135. Additionally, SGW 1117 may aggregate traffic received from one or more UPF/PGW-Us 1135 and may send the aggregated traffic to one or more eNBs 1113. SGW 1117 may operate as an anchor for the user plane during inter-eNB handovers and as an anchor for mobility between different telecommunication networks or RANs (e.g., RANs 1110 and 1112).

SMF/PGW-C 1120 may include one or more devices, systems, VNFs, CNFs, etc., that gather, process, store, and/or provide information in a manner described herein. SMF/PGW-C 1120 may, for example, facilitate the establishment of communication sessions on behalf of UE 1101. In some embodiments, the establishment of communications sessions may be performed in accordance with one or more policies provided by PCF/PCRF 1125.

PCF/PCRF 1125 may include one or more devices, systems, VNFs, CNFs, etc., that aggregate information to and from the 5G network and/or other sources. PCF/PCRF 1125 may receive information regarding policies and/or subscriptions from one or more sources, such as subscriber databases and/or from one or more users (such as, for example, an administrator associated with PCF/PCRF 1125).

AF 1130 may include one or more devices, systems, VNFs, CNFs, etc., that receive, store, and/or provide information that may be used in determining parameters (e.g., quality of service parameters, charging parameters, or the like) for certain applications.

UPF/PGW-U 1135 may include one or more devices, systems, VNFs, CNFs, etc., that receive, store, and/or provide data (e.g., user plane data). For example, UPF/PGW-U 1135 may receive user plane data (e.g., voice call traffic, data traffic, etc.), destined for UE 1101, from DN 1150, and may forward the user plane data toward UE 1101 (e.g., via RAN 1110, SMF/PGW-C 1120, and/or one or more other devices). In some embodiments, multiple UPFs 1135 may be deployed (e.g., in different geographical locations), and the delivery of content to UE 1101 may be coordinated via the N9 interface (e.g., as denoted in FIG. 11 by the line marked "N9" originating and terminating at UPF/PGW-U 1135). Similarly, UPF/PGW-U 1135 may receive traffic from UE 1101 (e.g., via RAN 1110, SMF/PGW-C 1120, and/or one or more other devices), and may forward the traffic toward DN 1150. In some embodiments, UPF/PGW-U 1135 may communicate (e.g., via the N4 interface) with SMF/PGW-C 1120, regarding user plane data processed by UPF/PGW-U 1135.

HSS/UDM 1140 and AUSF 1145 may include one or more devices, systems, VNFs, CNFs, etc., that manage, update, and/or store, in one or more memory devices associated with AUSF 1145 and/or HSS/UDM 1140, profile information associated with a subscriber. AUSF 1145 and/or HSS/UDM 1140 may perform authentication, authorization, and/or accounting operations associated with the subscriber and/or a communication session with UE 1101.

DN 1150 may include one or more wired and/or wireless networks. For example, DN 1150 may include an Internet Protocol ("IP")-based PDN, a wide area network ("WAN") such as the Internet, a private enterprise network, and/or one or more other networks. UE 1101 may communicate, through DN 1150, with data servers, other UEs 1101, and/or to other servers or applications that are coupled to DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which UE 1101 may communicate.

Figure 12:
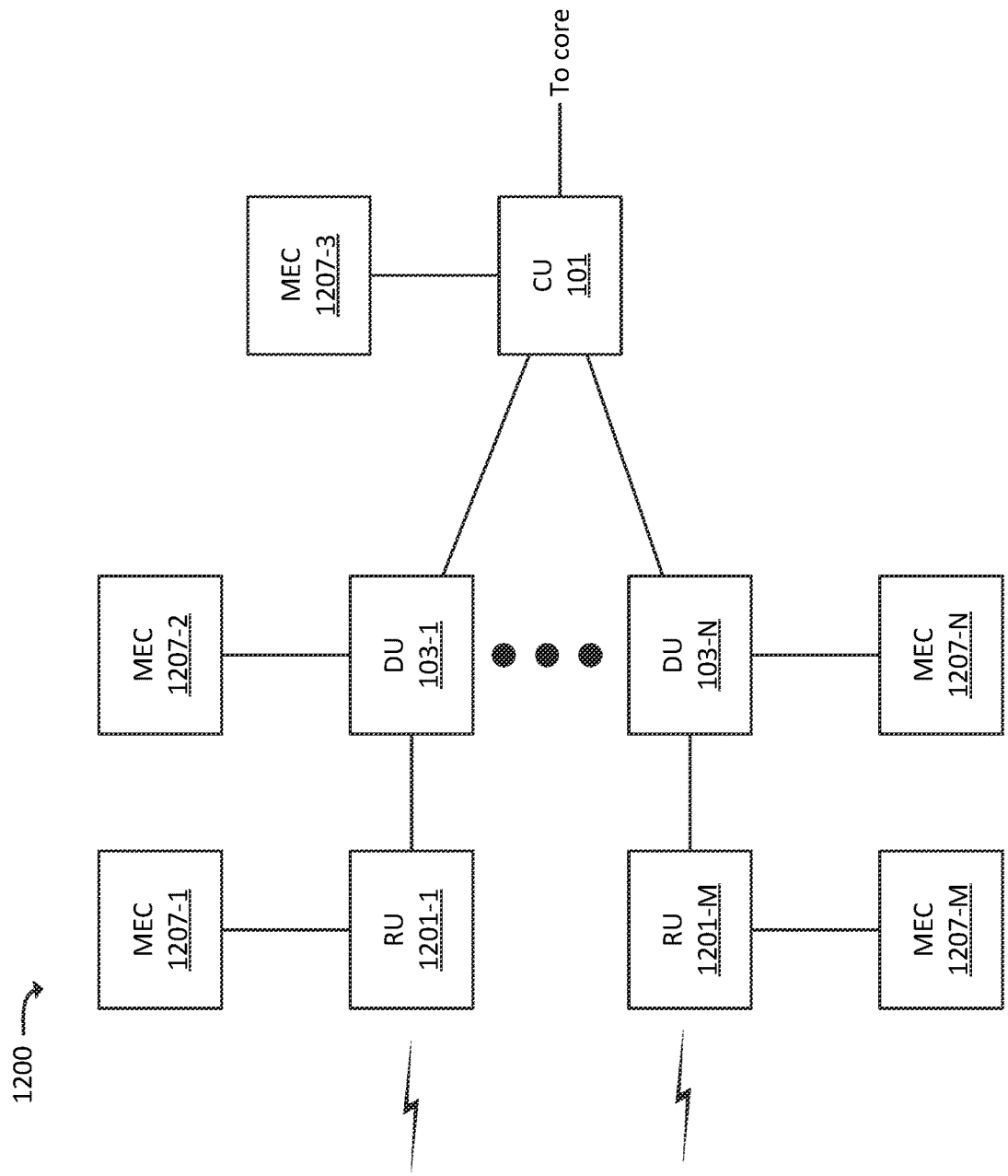
FIG. 12 illustrates an example arrangement of a radio access network ("RAN"), in accordance with some embodiments.

FIG. 12 illustrates an example DU network 1200, which may be included in and/or implemented by one or more RANs (e.g., RAN 1110, RAN 1112, or some other RAN). In some embodiments, a particular RAN may include one DU network 1200. In some embodiments, a particular RAN may include multiple DU networks 1200. In some embodiments, DU network 1200 may correspond to a particular gNB 1111 of a 5G RAN (e.g., RAN 1110). In some embodiments, DU network 1200 may correspond to multiple gNBs 1111. In some embodiments, DU network 1200 may correspond to one or more other types of base stations of one or more other types of RANs. As shown, DU network 1200 may include CU 101, one or more DUs 103-1 through 103-N, and one or more Radio Units ("RUs") 1201-1 through 1201-M.

As noted above, CU 101 may communicate with a core of a wireless network (e.g., may communicate with one or more of the devices or systems described above with respect to FIG. 11, such as AMF 1115 and/or UPF/PGW-U 1135). In the uplink direction (e.g., for traffic from UEs 1101 to a core network), CU 101 may aggregate traffic from DUs 103 (e.g., DUs 103 assigned to CU 101), and forward the aggregated traffic to the core network. In some embodiments, CU 101 may receive traffic according to a given protocol (e.g., Radio Link Control ("RLC")) from DUs 103, and may perform higher-layer processing (e.g., may aggregate/process RLC packets and generate Packet Data Convergence Protocol ("PDCP") packets based on the RLC packets) on the traffic received from DUs 103.

In accordance with some embodiments, CU 101 may receive downlink traffic (e.g., traffic from the core network) for a particular UE 1101, and may determine which DU(s) 103 should receive the downlink traffic. DU 103 may include one or more devices that transmit traffic between a core network (e.g., via CU 101) and UE 1101 (e.g., via a respective RU 1201). DU 103 may, for example, receive traffic from RU 1201 at a first layer (e.g., physical ("PHY") layer traffic, or lower PHY layer traffic), and may process/aggregate the traffic to a second layer (e.g., upper PHY and/or RLC). DU 103 may receive traffic from CU 101 at the second layer, may process the traffic to the first layer, and provide the processed traffic to a respective RU 1201 for transmission to UE 1101.

RU 1201 may include hardware circuitry (e.g., one or more RF transceivers, antennas, radios, and/or other suitable hardware) to communicate wirelessly (e.g., via an RF interface) with one or more UEs 1101, one or more other DUs 103 (e.g., via RUs 1201 associated with DUs 103), and/or any other suitable type of device. In the uplink direction, RU 1201 may receive traffic from UE 1101 and/or another DU 103 via the RF interface and may provide the traffic to DU 103. In the downlink direction, RU 1201 may receive traffic from DU 103, and may provide the traffic to UE 1101 and/or another DU 103.

RUs 1201 may, in some embodiments, be communicatively coupled to one or more Multi-Access/Mobile Edge Computing ("MEC") devices, referred to sometimes herein simply as "MECs" 1207. For example, RU 1201-1 may be communicatively coupled to MEC 1207-1, RU 1201-M may be communicatively coupled to MEC 1207-M, DU 103-1 may be communicatively coupled to MEC 1207-2, DU 103-N may be communicatively coupled to MEC 1207-N, CU 101 may be communicatively coupled to MEC 1207-3, and so on. MECs 1207 may include hardware resources (e.g., configurable or provisionable hardware resources) that may be configured to provide services and/or otherwise process traffic to and/or from UE 1101, via a respective RU 1201.

For example, RU 1201-1 may route some traffic, from UE 1101, to MEC 1207-1 instead of to a core network (e.g., via DU 103 and CU 101). MEC 1207-1 may process the traffic, perform one or more computations based on the received traffic, and may provide traffic to UE 1101 via RU 1201-1. In this manner, ultra-low latency services may be provided to UE 1101, as traffic does not need to traverse DU 103, CU 101, and an intervening backhaul network between DU network 1200 and the core network. In some embodiments, MEC 1207 may include, and/or may implement, some or all of the functionality described above with respect to CU 101, DU 103, and/or MOS 107.

Figure 13:
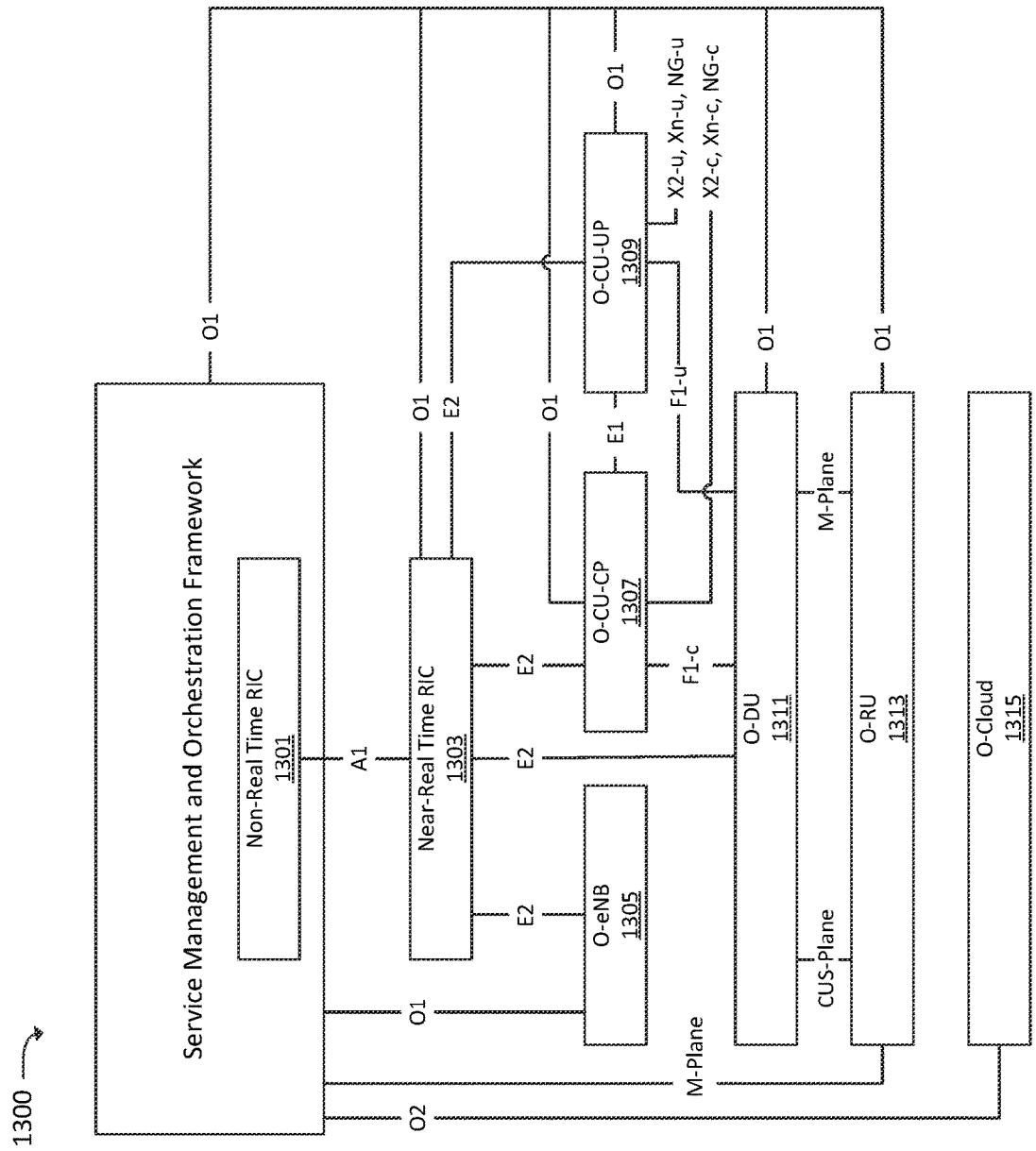
FIG. 13 illustrates an example arrangement of an Open RAN ("O-RAN") environment in which one or more embodiments, described herein, may be implemented.

FIG. 13 illustrates an example O-RAN environment 1300, which may correspond to RAN 1110, RAN 1112, and/or DU network 1200. For example, RAN 1110, RAN 1112, and/or DU network 1200 may include one or more instances of O-RAN environment 1300, and/or one or more instances of O-RAN environment 1300 may implement RAN 1110, RAN 1112, DU network 1200, and/or some portion thereof. As shown, O-RAN environment 1300 may include Non-Real Time Radio Intelligent Controller ("RIC") 1301, Near-Real Time RIC 1303, O-eNB 1305, O-CU-Control Plane ("O-CU-CP") 1307, O-CU-User Plane ("O-CU-UP") 1309, O-DU 1311, O-RU 1313, and O-Cloud 1315. In some embodiments, O-RAN environment 1300 may include additional, fewer, different, and/or differently arranged components.

In some embodiments, some or all of the elements of O-RAN environment 1300 may be implemented by one or more configurable or provisionable resources, such as virtual machines, cloud computing systems, physical servers, and/or other types of configurable or provisionable resources. In some embodiments, some or all of O-RAN environment 1300 may be implemented by, and/or communicatively coupled to, one or more MECs 1207.

Non-Real Time RIC 1301 and Near-Real Time RIC 1303 may receive performance information (and/or other types of information) from one or more sources, and may configure other elements of O-RAN environment 1300 based on such performance or other information. For example, Near-Real Time RIC 1303 may receive performance information, via one or more E2 interfaces, from O-eNB 1305, O-CU-CP 1307, and/or O-CU-UP 1309, and may modify parameters associated with O-eNB 1305, O-CU-CP 1307, and/or O-CU-UP 1309 based on such performance information. Similarly, Non-Real Time RIC 1301 may receive performance information associated with O-eNB 1305, O-CU-CP 1307, O-CU-UP 1309, and/or one or more other elements of O-RAN environment 1300 and may utilize machine learning and/or other higher level computing or processing to determine modifications to the configuration of O-eNB 1305, O-CU-CP 1307, O-CU-UP 1309, and/or other elements of O-RAN environment 1300. In some embodiments, Non-Real Time RIC 1301 may generate machine learning models (e.g., which may include and/or may be based on DU models 201) based on performance information associated with O-RAN environment 1300 or other sources, and may provide such models to Near-Real Time RIC 1303 for implementation. In some embodiments, Non-Real Time RIC 1301 and/or Near-Real Time RIC 1303 may include, may implement, and/or may be communicatively coupled to MOS 107.

O-eNB 1305 may perform functions similar to those described above with respect to eNB 1113. For example, O-eNB 1305 may facilitate wireless communications between UE 1101 and a core network. O-CU-CP 1307 may perform control plane signaling to coordinate the aggregation and/or distribution of traffic via one or more DUs 103, which may include and/or be implemented by one or more O-DUs 1311, and O-CU-UP 1309 may perform the aggregation and/or distribution of traffic via such DUs 103 (e.g., O-DUs 1311). O-DU 1311 may be communicatively coupled to one or more RUs 1201, which may include and/or may be implemented by one or more O-RUs 1313. In some embodiments, O-Cloud 1315 may include or be implemented by one or more MECs 1207, which may provide services, and may be communicatively coupled, to O-CU-CP 1307, O-CU-UP 1309, O-DU 1311, and/or O-RU 1313 (e.g., via an O1 and/or O2 interface).

Figure 14:
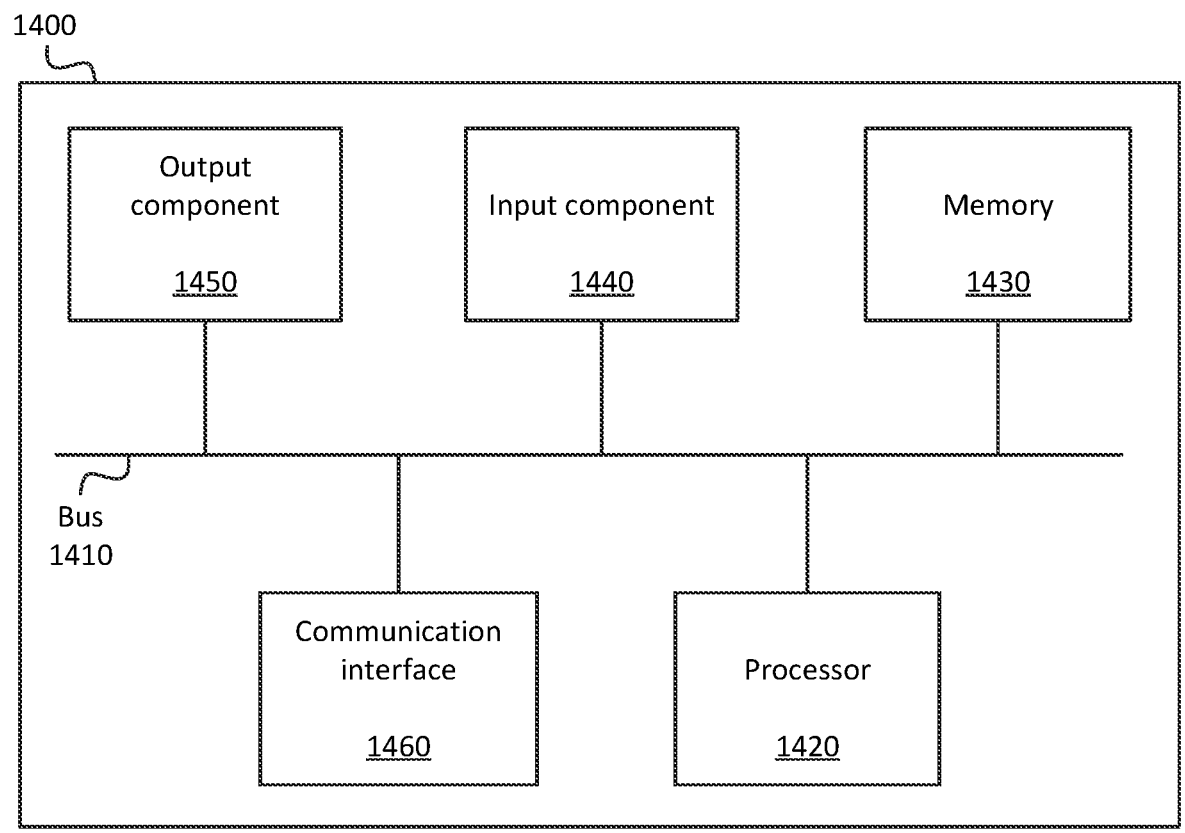
FIG. 14 illustrates example components of one or more devices, in accordance with one or more embodiments described herein.

FIG. 14 illustrates example components of device 1400. One or more of the devices described above may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. In some embodiments, processor 1420 may be or may include one or more hardware processors. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400 and/or other receives or detects input from a source external to 1440, such as a touchpad, a touchscreen, a keyboard, a keypad, a button, a switch, a microphone or other audio input component, etc. In some embodiments, input component 1440 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-10), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify a first model associated with a first set of Distributed Unit ("DUs") associated with a wireless network, wherein the first model includes a first usage pattern;
identify a second model associated with a second set of DUs associated with the wireless network, wherein the second model includes a second usage pattern that is different from the first usage pattern;
determine, based on comparing the first usage pattern to the second usage pattern, that the first and second sets of DUs are complementary DUs with respect to each other; and
associate, based on determining that the first and second sets of DUs are complementary DUs, a particular Centralized Unit ("CU") of the wireless network with at least a first DU of the first set of DUs and at least a second DU of the second set of DUs.

2. The device of claim 1, wherein the wireless network includes one or more other CUs, wherein associating the first CU with the first and second DUs causes uplink traffic, sent by the first and second DUs toward a core of the wireless network to be received by the particular CU in lieu of the one or more other CUs of the wireless network.

3. The device of claim 1, wherein determining that the first and second sets of DUs are complementary DUs includes determining that a peak combined measure of usage over a particular time window, associated with the first and second models, is within a threshold range of a peak measure of usage associated with the first model.

4. The device of claim 3, wherein determining that the peak combined measure of usage associated with the first and second models is within the threshold range of the peak measure of usage associated with the first model includes determining that a difference between (a) the peak combined measure of usage associated with the first and second models and (b) the peak measure of usage associated with the first model is less than a threshold difference.

5. The device of claim 3, wherein determining that the first and second sets of DUs are complementary DUs further includes determining that the peak combined measure of usage over the particular time window, associated with the first and second models, is greater than or equal to a peak measure of usage associated with the second model.

6. The device of claim 1, wherein the first model indicates at least a threshold measure of usage within a first portion of a particular time period, and wherein the second model indicates at least the threshold measure of usage within a different second portion of the particular time period.

7. The device of claim 1, wherein associating the particular CU with at least the first and second DUs includes allocating an amount of resources based on a peak measure of load, over a particular time window, associated with the first and second DUs.

8. A non-transitory computer-readable medium, storing a plurality of processor-executable instructions to:
identify a first model associated with a first set of Distributed Unit ("DUs") associated with a wireless network, wherein the first model includes a first usage pattern;
identify a second model associated with a second set of DUs associated with the wireless network, wherein the second model includes a second usage pattern that is different from the first usage pattern;
determine, based on comparing the first usage pattern to the second usage pattern, that the first and second sets of DUs are complementary DUs with respect to each other; and
associate, based on determining that the first and second sets of DUs are complementary DUs, a particular Centralized Unit ("CU") of the wireless network with at least a first DU of the first set of DUs and at least a second DU of the second set of DUs.

9. The non-transitory computer-readable medium of claim 8, wherein the wireless network includes one or more other CUs, wherein associating the first CU with the first and second DUs causes uplink traffic, sent by the first and second DUs toward a core of the wireless network to be received by the particular CU in lieu of the one or more other CUs of the wireless network.

10. The non-transitory computer-readable medium of claim 8, wherein determining that the first and second sets of DUs are complementary DUs includes determining that a peak combined measure of usage over a particular time window, associated with the first and second models, is within a threshold range of a peak measure of usage associated with the first model.

11. The non-transitory computer-readable medium of claim 10, wherein determining that the peak combined measure of usage associated with the first and second models is within the threshold range of the peak measure of usage associated with the first model includes determining that a difference between (a) the peak combined measure of usage associated with the first and second models and (b) the peak measure of usage associated with the first model is less than a threshold difference.

12. The non-transitory computer-readable medium of claim 10, wherein determining that the first and second sets of DUs are complementary DUs further includes determining that the peak combined measure of usage over the particular time window, associated with the first and second models, is greater than or equal to a peak measure of usage associated with the second model.

13. The non-transitory computer-readable medium of claim 8, wherein the first model indicates at least a threshold measure of usage within a first portion of a particular time period, and wherein the second model indicates at least the threshold measure of usage within a different second portion of the particular time period.

14. The non-transitory computer-readable medium of claim 8, wherein associating the particular CU with at least the first and second DUs includes allocating an amount of resources based on a peak measure of load, over a particular time window, associated with the first and second DUs.

15. A method, comprising:
   identifying a first model associated with a first set of Distributed Unit ("DUs") associated with a wireless network, wherein the first model includes a first usage pattern;
   identifying a second model associated with a second set of DUs associated with the wireless network, wherein the second model includes a second usage pattern that is different from the first usage pattern;
   determining, based on comparing the first usage pattern to the second usage pattern, that the first and second sets of DUs are complementary DUs with respect to each other; and
   associating, based on determining that the first and second sets of DUs are complementary DUs, a particular Centralized Unit ("CU") of the wireless network with at least a first DU of the first set of DUs and at least a second DU of the second set of DUs.

16. The method of claim 15, wherein the wireless network includes one or more other CUs, wherein associating the first CU with the first and second DUs causes uplink traffic, sent by the first and second DUs toward a core of the wireless network to be received by the particular CU in lieu of the one or more other CUs of the wireless network.

17. The method of claim 15, wherein determining that the first and second sets of DUs are complementary DUs includes determining that a peak combined measure of usage over a particular time window, associated with the first and second models, is within a threshold range of a peak measure of usage associated with the first model.

18. The method of claim 17, wherein determining that the peak combined measure of usage associated with the first and second models is within the threshold range of the peak measure of usage associated with the first model includes determining that a difference between (a) the peak combined measure of usage associated with the first and second models and (b) the peak measure of usage associated with the first model is less than a threshold difference.

19. The method of claim 17, wherein determining that the first and second sets of DUs are complementary DUs further includes determining that the peak combined measure of usage over the particular time window, associated with the first and second models, is greater than or equal to a peak measure of usage associated with the second model.

20. The method of claim 15, wherein the first model indicates at least a threshold measure of usage within a first portion of a particular time period, and wherein the second model indicates at least the threshold measure of usage within a different second portion of the particular time period.

* * * * *